US010896387B2

(12) United States Patent
Prokopenya et al.

(10) Patent No.: US 10,896,387 B2
(45) Date of Patent: Jan. 19, 2021

(54) SELF-ADAPTIVE, SELF-TRAINED COMPUTER ENGINES BASED ON MACHINE LEARNING AND METHODS OF USE THEREOF

(71) Applicant: Capital Com SV Investments Limited, Limassol (CY)

(72) Inventors: Viktor Prokopenya, London (GB); Irene Chavlytko, Minsk (BY); Alexei Shpikat, Minsk (BY); Maksim Vatkin, Minsk (BY)

(73) Assignee: Capital Com SV Investments Limited, Limassol (CY)

( * ) Notice: Subject to any disclaimer, the term of this patent is extended or adjusted under 35 U.S.C. 154(b) by 24 days.

(21) Appl. No.: 16/450,526

(22) Filed: Jun. 24, 2019

(65) Prior Publication Data

US 2019/0311294 A1 Oct. 10, 2019

Related U.S. Application Data

(63) Continuation of application No. 15/949,775, filed on Apr. 10, 2018, now Pat. No. 10,332,034.

(Continued)

(51) Int. Cl.
*G06N 20/00* (2019.01)
*G09B 7/00* (2006.01)
*G09B 5/02* (2006.01)
*G09B 5/12* (2006.01)
*G06F 16/28* (2019.01)
(Continued)

(52) U.S. Cl.
CPC ........... *G06N 20/00* (2019.01); *G06F 16/285* (2019.01); *G06F 16/355* (2019.01); *G09B 5/02* (2013.01); *G09B 5/125* (2013.01); *G09B 7/00* (2013.01); *G06N 3/08* (2013.01)

(58) Field of Classification Search
None
See application file for complete search history.

(56) References Cited

PUBLICATIONS

Song, et al., A Cross-Layer Architecture of Wireless Sensor Networks for Target Tracking, IEEE/ACM Transactions on Networking, vol. 15, No. 1, 2007, pp. 145-158 (Year: 2007).*

(Continued)

*Primary Examiner* — Wilbert L Starks
(74) *Attorney, Agent, or Firm* — Greenberg Traurig, LLP

(57) ABSTRACT

In some embodiments, the present invention provides for a computer system which includes a content database storing initial content data and a vocabulary data set; a processor configured to applying a machine learning model to transform the initial content data into a N-dimensional vector space; self-training the machine learning model based on the vocabulary data set; applying a clustering technique to the N-dimensional vector space to generate a cluster model of clusters, where each cluster includes a plurality of word representations; associating each cluster with a cluster identifier; obtaining subsequent content data; associating each data element of the subsequent content data with each cluster to generate a content data cluster mapping model; continuously tracking, for each user, each respective cluster identifier of each respective cluster associated with each action performed by each user with each data element to continuously self-adapt each user-specific, time-specific dynamic cluster mapping model.

12 Claims, 4 Drawing Sheets

Related U.S. Application Data

(60) Provisional application No. 62/483,679, filed on Apr. 10, 2017.

(51) Int. Cl.
*G06F 16/35* (2019.01)
*G06N 3/08* (2006.01)

(56) References Cited

PUBLICATIONS

Qiu, et al., Neural Network Implementations for PCA and Its Extensions, International Scholarly Research Network (ISRN), Artificial Intelligence, vol. 2012, Article ID 847305, pp. 1-19 (Year: 2012).*

* cited by examiner

SELF-ADAPTIVE, SELF-TRAINED COMPUTER ENGINES BASED ON MACHINE LEARNING AND METHODS OF USE THEREOF

CROSS-REFERENCE TO RELATED APPLICATIONS

This application is a continuation of U.S. patent application Ser. No. 15/949,775 filed Apr. 10, 2018, which claims benefit of U.S. provisional patent application Ser. No. 62/483,679 filed Apr. 10, 2017, which are herein incorporated by reference.

FIELD OF THE INVENTION

Generally the present disclosure is directed towards self-adaptive, self-trained computer engines based on machine learning and methods of use thereof.

BACKGROUND

Typically, machine learning models employ one or more layers to generate an output, e.g., a classification, for a received input. Some machine learning models include one or more hidden layers in addition to an output layer. The output of each hidden layer is used as input to the next layer, i.e., the next hidden layer or the output layer. Each layer may generate an output from a received input in accordance with current values of a respective set of parameters.

SUMMARY OF THE INVENTION

In some embodiments, the present invention provides for an exemplary self-adaptive, self-train computer system which includes at least the following components: a plurality of electronic content feeds from a plurality of distinct electronic sources; at least one content database that is configured to store at least: i) initial content data derived from the plurality of electronic content feeds, and ii) vocabulary data that includes at least one vocabulary data set that includes at least one of: 1) a set of pre-determined words, phrases, or both, and 2) a set of user-specific words, phrases, or both that is associated with at least one particular user of the system; a non-transient memory, storing particular program code; and at least one computer processor that, when executing the particular program code, is configured to perform at least the following operations: obtaining at least one portion of the initial content data from the at least one content database; applying at least one machine learning model to transform the at least one portion of the initial content data into a N-dimensional vector space; self-training the at least one machine learning model based on the at least one vocabulary data set; applying at least one clustering technique to the N-dimensional vector space to generate a cluster model that defines a plurality of clusters, where each cluster includes a plurality of word representations from the at least one portion of the initial content data; associating each cluster of the plurality of clusters of the cluster model with at least cluster identifier; obtaining at least one portion of first subsequent content data from the at least one content database; where the first subsequent content data is content data received from the plurality of electronic content feeds from the plurality of distinct electronic sources after the cluster model has been generated during at least one first time period; associating each data element of at least one portion of the first subsequent content data with each respective cluster of the plurality of clusters of the cluster model to generate a content data cluster mapping model; continuously tracking, for each user, in real-time, each respective cluster identifier of each respective cluster associated with at least one action performed by each respective user with at least one data element from at least one respective portion of the first subsequent content data during each respective time period to continuously self-adapt each respective user-specific, time-specific dynamic cluster mapping model based, at least in part, on the at least one action performed by each respective user during each respective time; where each respective user-specific, time-specific dynamic cluster mapping model includes a plurality of user-specific, time-specific cluster identifiers; continuously updating, for each user, each respective user-specific, time-specific dynamic cluster mapping model in at least one user profile database; applying each respective user-specific, time-specific dynamic cluster mapping model to at least one portion of second content data obtained during at least one second time period to determine a user-specific output content data to be delivered to each respective user at a particular time period; and causing to display the user-specific output content data on a screen of at least one portable electronic device of each respective user.

In some embodiments, the user-specific output content data includes: i) a first portion that has been determined based, at least in part, on one or more cluster identifiers of each respective user-specific, time-specific dynamic cluster mapping model at a particular time period, and ii) a second portion that has not been determined based, at least in part, on one or more cluster identifiers of each respective user-specific, time-specific dynamic cluster mapping model at the particular time period.

In some embodiments, the first portion and the second portion are at a pre-determined ratio.

In some embodiments, the at least one computer processor is further configured to perform at least the following operations: updating, for each user, each respective user-specific, time-specific dynamic cluster mapping model based, at least in part, on at least one of: i) at least one biological feature of each respective user, ii) at least one social feature of each respective user, iii) at least one economic feature of each respective user, iv) at least one behavioral feature of each respective user, and v) any combination thereof.

In some embodiments, the at least one computer processor is further configured to perform the operations with a pre-determined frequency.

In some embodiments, the at least one machine learning model is Doc2Vec model.

In some embodiments, the at least one clustering technique assigns each respective word representation to a particular cluster to which each respective word representation has the smallest respective angular distance.

In some embodiments, the at least one computer processor is further configured to perform: obtaining user-specific educational content data from at least one educational feed based, at least in part, on each respective user-specific, time-specific dynamic cluster mapping model; and causing to display the user-specific educational content data on the screen of the at least one portable electronic device of each respective user.

In some embodiments, the at least one computer processor is further configured to perform: automatically subscribing each respective user to receive at least one content feed based, at least in part, on each respective user-specific, time-specific dynamic cluster mapping model.

In some embodiments, N of the N-dimensional vector space is pre-determined.

In some embodiments, the present invention provides for an exemplary computer-implemented method which includes at least the following steps: obtaining, by at least one processor, at least one portion of initial content data from at least one content database; where the at least one content database includes: i) the initial content data derived from a plurality of electronic content feeds from a plurality of distinct electronic sources, and ii) vocabulary data that includes at least one vocabulary data set that includes at least one of: 1) a set of pre-determined words, phrases, or both, and 2) a set of user-specific words, phrases, or both that is associated with at least one particular user; applying, by the at least one processor, at least one machine learning model to transform the at least one portion of the initial content data into a N-dimensional vector space; self-training, by the at least one processor, the at least one machine learning model based on the at least one vocabulary data set; applying, by the at least one processor, at least one clustering technique to the N-dimensional vector space to generate a cluster model that defines a plurality of clusters, where each cluster includes a plurality of word representations from the at least one portion of the initial content data; associating, by the at least one processor, each cluster of the plurality of clusters of the cluster model with at least cluster identifier; obtaining, by the at least one processor, at least one portion of first subsequent content data from the at least one content database; where the first subsequent content data is content data received from the plurality of electronic content feeds from the plurality of distinct electronic sources after the cluster model has been generated during at least one first time period; associating, by the at least one processor, each data element of at least one portion of the first subsequent content data with each respective cluster of the plurality of clusters of the cluster model to generate a content data cluster mapping model; continuously tracking, for each user, in real-time, by the at least one processor, each respective cluster identifier of each respective cluster associated with at least one action performed by each respective user with at least one data element from at least one respective portion of the first subsequent content data during each respective time period to continuously self-adapt each respective user-specific, time-specific dynamic cluster mapping model based, at least in part, on the at least one action performed by each respective user during each respective time; where each respective user-specific, time-specific dynamic cluster mapping model includes a plurality of user-specific, time-specific cluster identifiers; continuously updating, for each user, by the at least one processor, each respective user-specific, time-specific dynamic cluster mapping model in at least one user profile database; applying, by the at least one processor, each respective user-specific, time-specific dynamic cluster mapping model to at least one portion of second content data obtained during at least one second time period to determine a user-specific output content data to be delivered to each respective user at a particular time period; and causing, by the at least one processor, to display the user-specific output content data on a screen of at least one portable electronic device of each respective user.

BRIEF DESCRIPTION OF THE DRAWINGS

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

Figure 1:
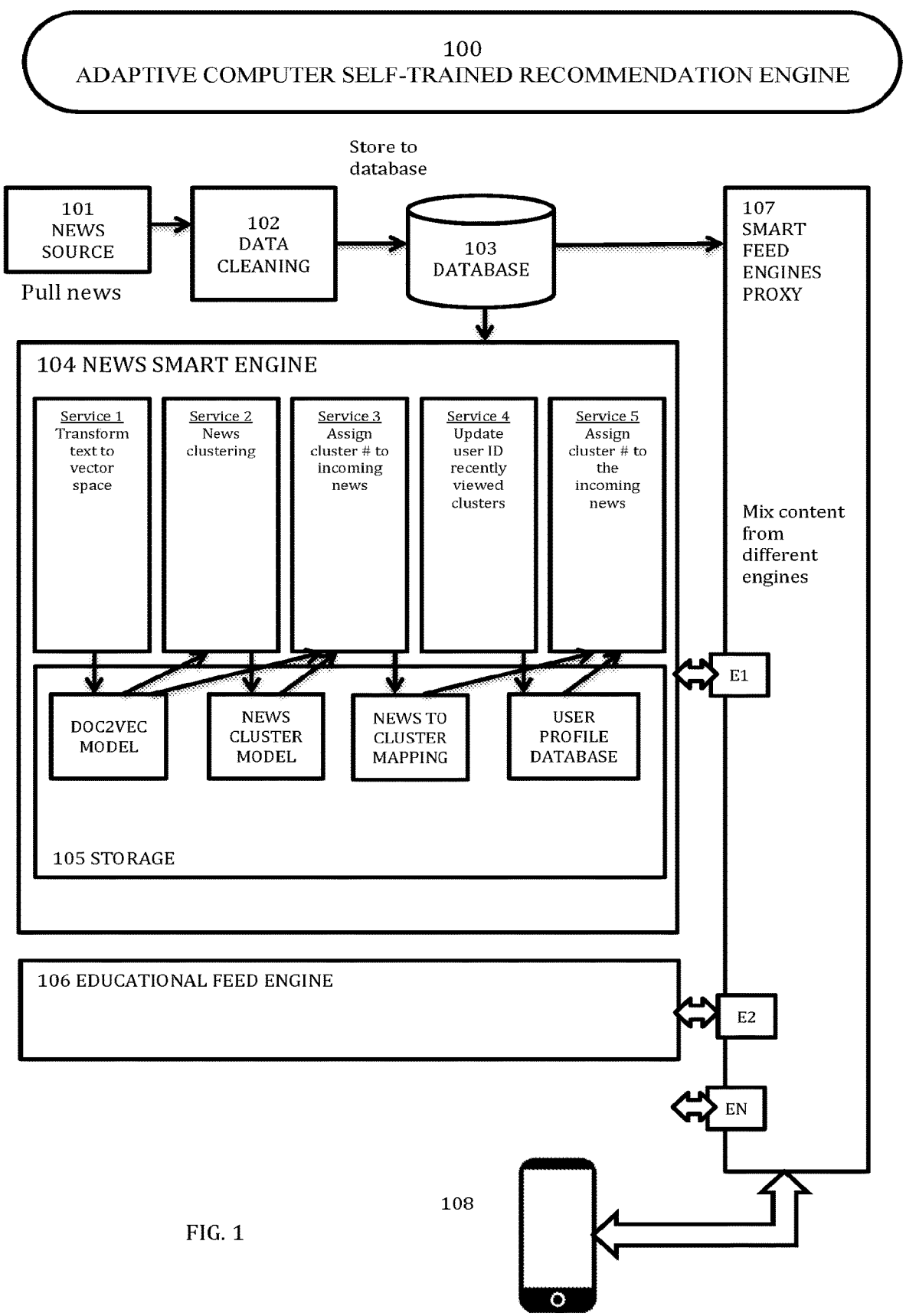
FIGS. 1-4 show flow diagrams and/or certain computer architectures which are representative of some exemplary aspects of the present invention in accordance with at least some principles of at least some embodiments of the present invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DESCRIPTION OF EXEMPLARY EMBODIMENTS

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred (e.g., less than 1 second difference between sequential events/actions).

As used herein, the term "dynamic(ly)" means that events and/or actions can be triggered and/or occur without any human intervention.

As used herein, the term "computer engine" identifies at least one software component and/or a combination of at least one software component and at least one hardware component which are designed/programmed/configured to manage/control other software and/or hardware components (such as the libraries, software development kits (SDKs), objects, etc.).

In some embodiments, the inventive specially programmed computing systems with associated devices are configured to operate in the distributed network environment, communicating over a suitable data communication network (e.g., the Internet, etc.) and utilizing at least one suitable data communication protocol (e.g., IPX/SPX, X.25, AX.25, AppleTalk™, TCP/IP (e.g., HTTP), etc.). Of note, the embodiments described herein may, of course, be implemented using any appropriate hardware and/or computing software languages. In this regard, those of ordinary skill in the art are well versed in the type of computer hardware that may be used, the type of computer programming techniques that may be used (e.g., object oriented programming), and the type of computer programming languages that may be used (e.g., C++, Basic, AJAX, JavaScript). The aforementioned examples are, of course, illustrative and not restrictive.

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dualcore mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

In some embodiments, an exemplary adaptive computer self-trained recommendation engine is configured/programmed to provide a user with relevant subscription/recommendation for electronic content (e.g., text, visual information, mobile applications, etc.) based on their real and/or virtual biological (e.g., demographical), social, economic, and/or behavioral feature(s)/characteristic(s)—transforming massive amounts of electronic content into user-relevant and user-manageable electronic content that is feasible for a user to meaningfully digest. In some embodiments, an exemplary adaptive computer self-trained recommendation engine is configured/programmed to provide a user with relevant subscription for electronic content (e.g., text, visual information, mobile applications, etc.) based on their real and/or virtual biological (e.g., demographical), social, economic, and/or behavioral feature(s)/characteristic(s) without analyzing the user's preference(s) in similar electronic content (e.g., without user's input).

In some embodiments, an exemplary adaptive computer self-trained recommendation engine is configured/programmed to receive from the user a rating feedback to its recommendations in the form of, for example, but not limited to, qualitative rating (e.g., positive, negative, like, dislike, etc.), quantitative rating, or combination thereof. In some embodiments, the exemplary adaptive computer self-trained recommendation engine is configured/programmed to utilize the rating feedback to continuously and dynamically self-train as a positive feedback loop. In some embodiments, the positive feedback loop may be in the form of automatically updating at least one user-specific vocabulary having words, phrases, or both.

In some embodiments, the exemplary adaptive computer self-trained recommendation engine is configured/programmed to utilize at least one machine learning algorithm to predict interests of users based on their real and/or biological (e.g., demographical), social, economic, and/or behavioral feature(s)/characteristic(s), and, then, utilize the predictions to, for example (without limitation), automatically update at least one user-specific vocabulary having words, phrases, or both.

In some embodiments, the exemplary adaptive computer self-trained recommendation engine is configured/programmed to provide a user with relevant subscription/recommendation without the need for the user, or any other users, to take an action such as, but not limited to, rate an item, select a content that they like from the large volume of information (e.g. the user does not need to select a subscription channel from which relevant news will be delivered), etc. In some embodiments, the exemplary adaptive computer self-trained recommendation engine is configured/programmed to utilize an input from the user ("like"/"dislike") for elements of the electronic content used as a positive feedback loop for the algorithm, by, for example (without limitation), automatically updating at least one user-specific vocabulary having words, phrases, or both.

In some embodiments, the exemplary adaptive computer self-trained recommendation engine is configured/programmed to operate via, but not limited to, a typical on-line platform (e.g., utilizing typical Internet environment via a typical internet browser (e.g., Chrome, Mozilla, Opera), a mobile platform, a gaming console platform, any other similarly suitable environment, and any combination thereof.

In some embodiments, the exemplary adaptive computer self-trained recommendation engine is configured/programmed to utilize at least one machine-learning algorithm, which can take, for example, the user's real and/or virtual biological (e.g., age, gender, etc.), social (e.g., residency, education, passport data, etc.), economic (e.g., average income, etc.) and/or behavioral (e.g., actions while using mobile application, how the user performs trades using the application, etc.) data, then process such data and generate relevant electronic content (subscription/recommendation) as an output (e.g., corporate actions news, economical calendar, facts and/or definitions relevant to the user's action made by them in an application, statistics, etc.).

In some embodiments, the exemplary adaptive computer self-trained recommendation engine is configured/programmed to preliminarily segment the generated electronic content into topic areas ("channels") and stored on a server prior to being transmitted to electronic devices of users. In some embodiments, the exemplary adaptive computer self-trained recommendation engine is configured/programmed to utilize the stored generated content to further update and apply that at least one machine learning algorithm/technique to self-train by, for example (without limitation), automatically updating at least one user-specific vocabulary having words, phrases, or both. One user could be automatically subscribed for several channels. Each element of the electronic content provides an option for the user to rate it using binary grading system ("like"/"dislike"). If the user choses to do this, the system will take their input and add it to the set of features (e.g., user-specific vocabulary having words, phrases, or both) used by one or more exemplary machine-learning algorithms of the present invention. In some embodiments, the exemplary system may be trained by utilizing at least one pre-determined vocabulary that may not be user-specific.

In some embodiments, the exemplary adaptive computer self-trained recommendation engine is configured/programmed to support trading platforms. In some embodiments, the exemplary adaptive computer self-trained recommendation engine is configured/programmed to generate and/or recommend news feeds.

FIG. 1 illustrates an exemplary scheme of the exemplary adaptive computer self-trained recommendation engine which is configured/programmed to generate personalized recommendations in accordance with one or more principles of the present invention.

In FIG. 1, the News Source 101 is at least one exemplary electronic source of electronic news content (e.g., database, website, RSS feed, etc.). For example, the News Source 101 may be Benzinga (www.benzinga.com) and/or others similarly suitable electronic source(s).

In FIG. 1, a module Data Cleaning 102 is configured to at least detect, correct, and/or remove corrupt and/or inaccurate records from the electronic news content. For example, some parts of information received from a data feed may have field(s) that could not be read (corrupted) and/or would have no data (absent). Such fields may be represented by NAN ("not a number") or NA ("not available") entries. Typically, the rows, which may contain such entries, may be removed from the data stream and not stored nor processed further. Other examples may be data enhancement, where the feed data may be made more complete by adding related information, or standartisation, e.g., modifying addresses by changing "street", "st.", "str." to "St", etc.

In FIG. 1, Database 103 represents computer software and/or hardware component(s) that store(s) and process(es) data pieces of the electronic news content which are used as inputs for an exemplary inventive News Smart Engine 104 component and the exemplary inventive Smart Feed Engines Proxy 107 component. The examples of the Database 103 may be HP Vertica, PostgreSQL, etc. In some embodiments, the News Smart Engine 104 is the inventive component of computer software and/or hardware that is configured/programmed to utilize the electronic news content and user data as inputs for the self-trained prediction, clustering, and mapping to generate user-personalized recommendations.

In some embodiments, the exemplary News Smart Engine 104 of the present invention may provide/execute a plurality of the following services. For example, the exemplary News Smart Engine 104 may execute as Service 1 at least one machine learning text-recognition algorithm which is configured to transform electronic text information of the electronic content (e.g., news) to at least one vector space of features (word embeddings or distributed vector representations of words) to generate an exemplary Doc2Vec vector space model having, for example, N pre-determined dimensions (e.g., N=50, 100, 300, etc.). For example, based on the Doc2Vec model, the text "people like words" may be transformed to a vector: [−0.03758248 −0.01040207 −0.00246261 0.03027108 −0.0460688 0.03295968 −0.04934755 −0.03424022 0.01716141 −0.02764493]. In some embodiments, the Doc2Vec model is based on the application of the machine learning. In one example, the generation and application of the Doc2Vec model is performed by the exemplary News Smart Engine 104 in accordance with at least some principles detailed in Mikolov et al., "Efficient estimation of word representations in vector space," *Proceedings of Workshop at the International Conference on Learning Representations* (2013, Scottsdale, USA) and Lau et al., "An Empirical Evaluation of doc2vec with Practical Insights into Document Embedding Generation," 1st Workshop on Representation Learning for NLP; *Proceedings of the* 1*st Workshop on Representation Learning for NLP,* Berlin, Germany, pp. 78-86 (July 2016) that are specifically incorporated by reference herein for such purpose.

For instance, to represent the words to the network, the exemplary News Smart Engine 104 accesses at least one database containing at least one pre-determined vocabulary of words to self-train the exemplary News Smart Engine 104. For example, based on the vocabulary, an exemplary training vector may have at least 10,000 components (e.g., one for every word in the vocabulary). Then, the output of the machine learning processing may be a single vector (also with 10,000 components) containing, for every word in at least one pre-determined vocabulary, the probability that a randomly selected nearby word is such vocabulary word. If two different words have a similar meaning (e.g., the same words are likely to appear around them), then the Doc2Vec model may output similar results for them. For example, the exemplary News Smart Engine 104 may be configured/programmed to utilize at least one Gensium-type vocabulary models (RaRe Technologies, Czech Republic) or similar.

For example, the exemplary News Smart Engine 104 may execute as Service 2 a machine-learning algorithm for clustering the electronic content to generate an exemplary News Cluster model to be used by an exemplary Service 3 as detailed below. In some embodiment, the exemplary News Cluster model is based on a clustering algorithm with angular distance measure (e.g., K-Means, DBSCAN, or other similarly suitable algorithms). The texts are represented by N-dimensional vectors (N could be arbitrary as it is determined by the machine-learning). Please see the example for the representation of the "people like words" above. There are M vectors for M texts which fill a space of vectors. The variety of vectors could then be clustered by one or more clustering techniques such as, without limitation, provided in Table 1.

TABLE 1

| Method name | Parameters | Geometry (metric used) |
| --- | --- | --- |
| K-Means | number of clusters | Distances between points |
| Affinity propagation | damping, sample preference | Graph distance (e.g. nearest-neighbor graph) |
| Mean-shift | bandwidth | Distances between points |
| Spectral clustering | number of clusters | Graph distance (e.g. nearest-neighbor graph) |
| Ward hierarchical clustering | number of clusters | Distances between points |
| Agglomerative clustering | number of clusters, linkage type, distance | Any pairwise distance |
| DBSCAN | neighborhood size | Distances between nearest points |
| Gaussian mixtures | many | Mahalanobis distances to centers |
| Birch | branching factor, threshold, optional global clusterer. | Euclidean distance between points |

In some embodiment, the exemplary Service 2 may be dynamically executed with a pre-determined frequency (e.g., hourly, daily, weekly, etc.).

For example, the exemplary News Smart Engine 104 may execute as Service 3 a prediction algorithm that may assign cluster identification numbers to data elements of the incoming electronic news content. In some embodiments, the Service 3 may be implemented based on one or more suitable machine learning classification algorithms (e.g., decision trees, boosting, support-vector machines, neural networks, nearest neighbor algorithms, Naive Bayes, bagging, random forests, etc.). In some embodiments, the output of the Service 3's processing is exemplary News to Cluster Mapping model which may be used by the Service 5. In some embodiments, the exemplary Service 3 may be dynamically executed with a pre-determined frequency (e.g., every second, every minute, hourly, daily, weekly, etc.).

For example, the exemplary News Smart Engine 104 may execute as Service 4 an algorithm configured to update a list of clusters for the user who has recently viewed news from those clusters and add this information (user-specific cluster mapping) to an exemplary User Profile Database. For example, the exemplary News Smart Engine 104 may be configured/programmed to mark (e.g., tagging) a particular cluster as viewed by the user with the user's unique identifier. The update of the User Profile may be programmed to occur either periodically (e.g., once a second, N seconds, every minute, N minutes, every hour, N hour, etc.) or upon a particular event/action (e.g., action of viewing). In some embodiments, the exemplary User Profile Database may be any suitable database (e.g., PostgreSQL, HP Vertica, etc.). In some embodiments, the processing of the Service 4 may be implemented by SQL requests and/or in programming languages (e.g. C++, Java, Python, etc.). In some embodiments, the exemplary Service 4 may be dynamically executed with a pre-determined frequency (e.g., every second, every minute, hourly, daily, weekly, etc.) and outputs of Service 4 may be stored to the User Profile Database and/or used by the Service 5 as detailed below.

For example, the exemplary News Smart Engine 104 may execute as Service 5 an algorithm for assigning cluster identification numbers to the data elements of the incoming electronic news content. In some embodiments, the exemplary Service 5 may dynamically filter the initial news content upon user's request so that it contains, for example, X% (e.g., 80%) of content based on clusters viewed by the user during the specified period of time (e.g. last day, last hour, last week, etc.) and Y% (e.g., 20%) of news from clusters not viewed by the user. In some embodiments, the ratio of X%/Y% may be 70%/30%, 90%/10%, etc. In some embodiments, the exemplary Service 5 may be dynamically executed with a pre-determined frequency (e.g., every second, every minute, hourly, daily, weekly, etc.)

In some examples, as shown in FIG. 1, the exemplary News Smart Engine 104 may access an exemplary Storage 105 component which may store the Doc2Vec model, News Cluster model, News to Cluster Mapping model, and User Profile Database.

In some examples, as shown in FIG. 1, the exemplary News Smart Engine 104 may further be configured to further interact with an exemplary Educational Feed Engine 106 that may be a computer-implemented system that provides educational algorithms and content (e.g., electronic quizzes, tests, facts, etc.). For example, educational content may be customized to the user in the same way as other content may be customized as detailed herein. In some embodiments, such the user customized educational content may be proposed to the user based on results of their actions (e.g., trades). For example, if a particular trade was not profitable, the exemplary educational algorithm may propose to the user some educational materials on a particular financial instrument and/or trading basics.

In some examples, as shown in FIG. 1, the exemplary adaptive computer selftrained recommendation engine may also include an exemplary Smart Feed Engines Proxy 107 that is software and/or hardware component(s) that are configured/programmed to mix content acquired from the exemplary News Smart Engine 104, the exemplary Educational Feed Engine 106, and, optionally, from other systems. For example, as shown in FIG. 1, E1, E2, . . . , EN are inputs/outputs of the Smart Feed Engines Proxy 107. The number of inputs/outputs may be 2, 3, 4, 5, 6, 7, 8, 9, 10, and more.

In some examples, as shown in FIG. 1, the exemplary adaptive computer self-trained recommendation engine may interface, via the exemplary Smart Engines Proxy 107, with, for example but not limited to, a portable device 108 of the user (e.g., any appropriate type of mobile devices, such as, but not limited to, mobile phones, smartphones and tablets smartphone).

For example, refereeing to FIG. 1, a user may select a financial instrument, e.g. "EURUSD". He/she may open his/her account and start trading using a mobile application programmed to be in communication with the exemplary Smart Engine 104. For example, the user's data (e.g. "EURUSD", trade results, age, etc.) may be coupled with the type of electronic content viewed by respective user that may be recorded and new portions of electronic content may be proposed to him/her via, for example, the Services 4-5 of the exemplary Smart Engine 104 of the present invention.

Figure 2:
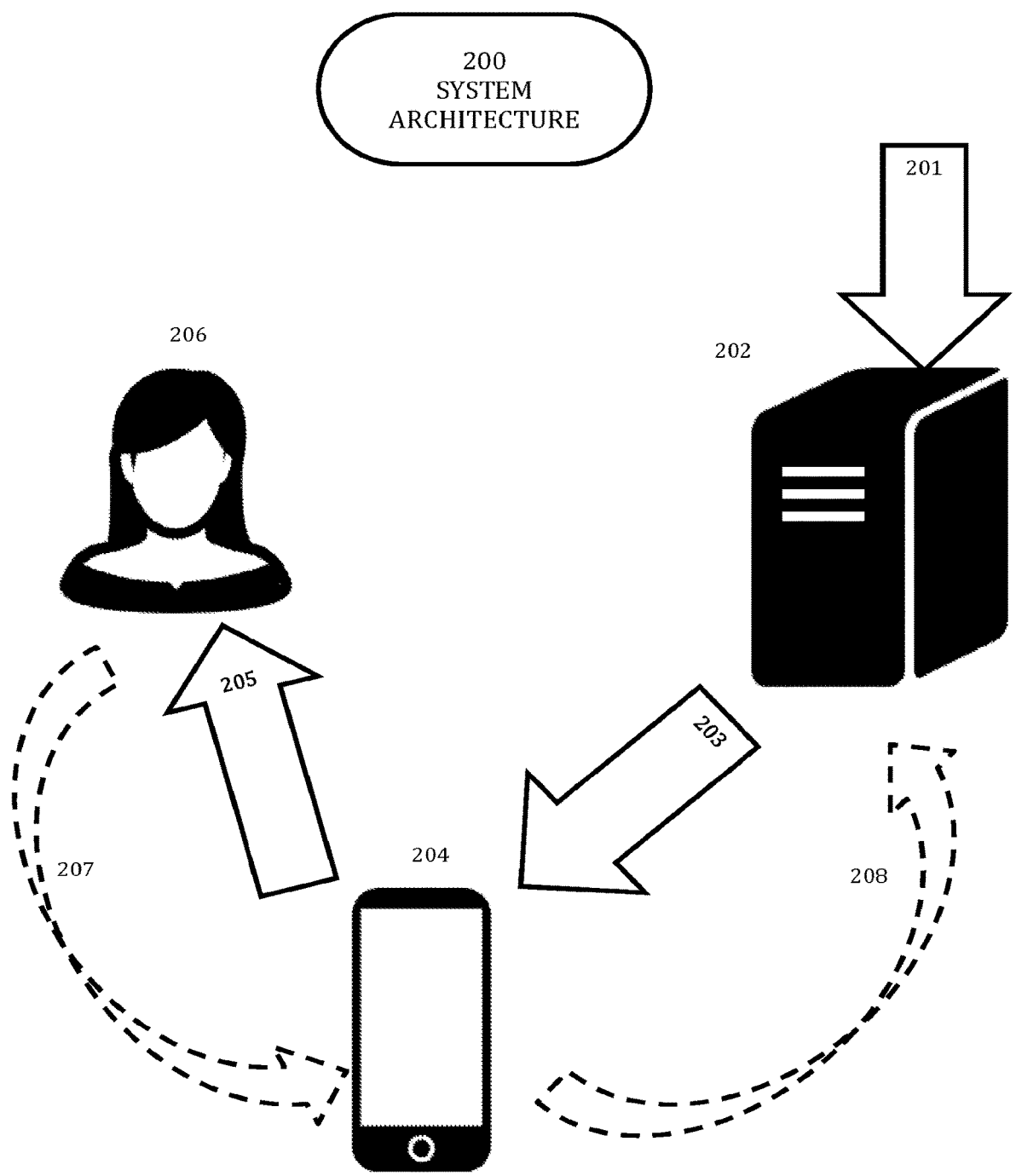

FIG. 2 illustrates an exemplary environment 200 incorporating certain embodiments of the present invention. As shown in FIG. 2, environment 200 may include at least one server 202, executing the exemplary adaptive computer self-trained recommendation engine, at least one mobile device 204 and at least one user 206. Other devices may also be included. For example, the exemplary mobile device 204 may include any appropriate type of mobile devices, such as mobile phones, smartphones and tablets. Further, the exemplary server 202 may include any appropriate type of server computer or a plurality of server computers for providing technical ability to perform external calculations and simulations in order to improve models used for mobile application, to store users' data or additional content for the application. For example, the user 206 may interact with the mobile device 204 by means of application controls. For example, the user 206 may be a single user or a plurality of users. For example, mobile device 204 and/or server 202 may be implemented on any appropriate computing circuitry platform. For example, the user 204 may or may not provide a feedback input 207 which is then transferred 208 to the server 202 for processing by the exemplary adaptive computer self-trained recommendation engine.

In some embodiments, the exemplary adaptive computer self-trained recommendation engine can obtain data from at least 10 distinct electronic sources of realtime data. In some embodiments, the exemplary adaptive computer self-trained recommendation engine can obtain data from at least 100 distinct electronic sources of real-time data. In some embodiments, the exemplary adaptive computer self-trained recommendation engine can obtain data from at least 1,000 distinct electronic sources of real-time data.

In some embodiments, the at least one mobile device 204 may include a browser application that is configured to receive and to send web pages, and the like. In embodiments, the browser application may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In embodiments, programming may include either Java, .Net, QT, C, C++ or other suitable programming language.

In some embodiments, the at least one mobile device 304 may be further configured to receive messages from another computing device employing another mechanism, including, but not limited to email, Short Message Service (SMS), Multimedia Message Service (MIMS), instant messaging (IM), internet relay chat (IRC), mIRC, Jabber, and the like or a Proprietary protocol.

In some embodiments, the term "mobile electronic device" may refer to any portable electronic device that may or may not be enabled with location tracking functionality. For example, a mobile electronic device can include, but is not limited to, a mobile phone, Personal Digital Assistant (PDA), Blackberry™, Pager, Smartphone, or any other reasonable mobile electronic device. For ease, at times the above variations are not listed or are only partially listed; this is in no way meant to be a limitation.

In some embodiments, the inventive computer engines of the present invention can utilize any form of location tracking technology or locating method. For example, the terms "proximity detection," "locating," "location data," "location information," and "location tracking" as used herein may refer to any form of location tracking technology or locating method that can be used to provide a location of a mobile electronic device, such as, but not limited to, at least one of location information manually input by a user, such as, but not limited to entering the city, town, municipality, zip code, area code, cross streets, or by any other reasonable entry to determine a geographical area; Global Positions Systems (GPS); GPS accessed using Bluetooth™; GPS accessed using any reasonable form of wireless and/or non-wireless communication; Wi-Fi™ server location data; Bluetooth™ based location data; triangulation such as, but not limited to, network based triangulation, Wi-Fi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

In some embodiments, the inventive computer engines of the present invention can utilize near-field wireless communication (NFC) representing a short-range wireless communications technology in which NFC-enabled devices are "swiped," "bumped," "tap" or otherwise moved in close proximity to communicate and gather relevant live stream data. In some embodiments, NFC could include a set of short-range wireless technologies, typically requiring a distance of 10 cm or less.

In some embodiments, NFC may operate at 13.56 MHz on ISO/IEC 18000-3 air interface and at rates ranging from 106 Kbit/s to 424 Kbit/s. In some embodiments, NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, NFC peer-to-peer communication can be conducted when a plurality of NFCenable devices within close proximity of each other.

Figure 3:
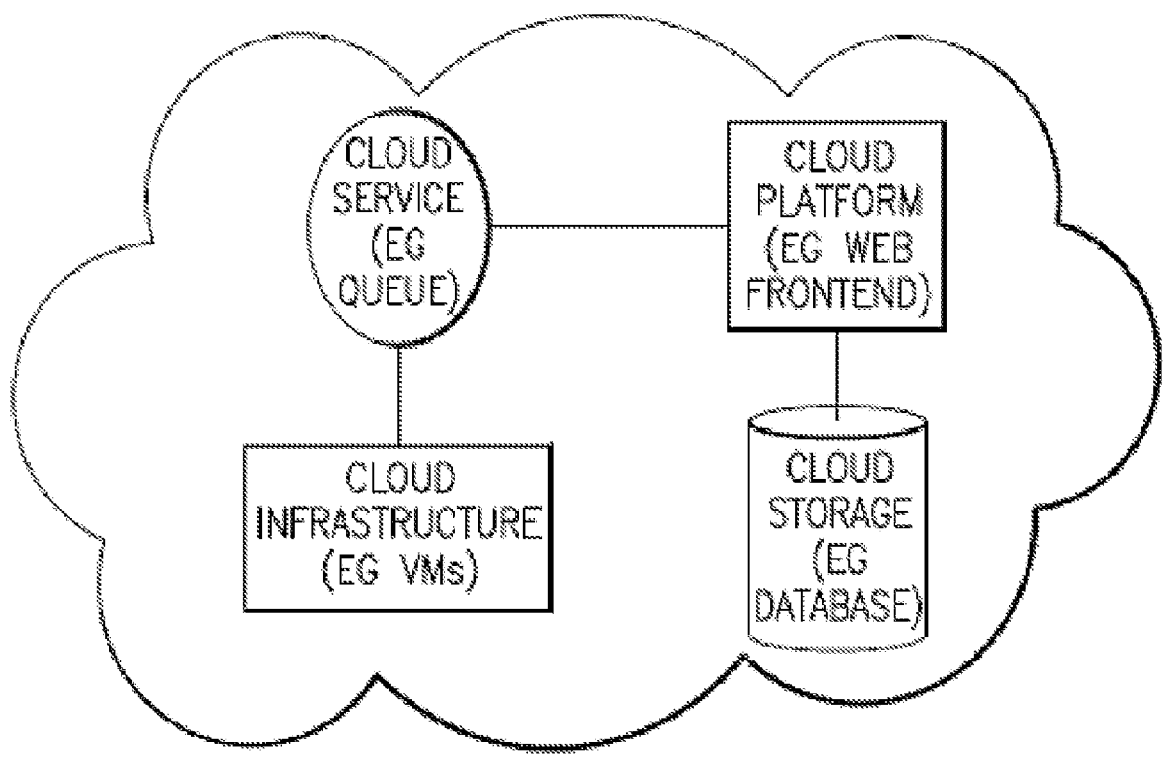
Figure 4:
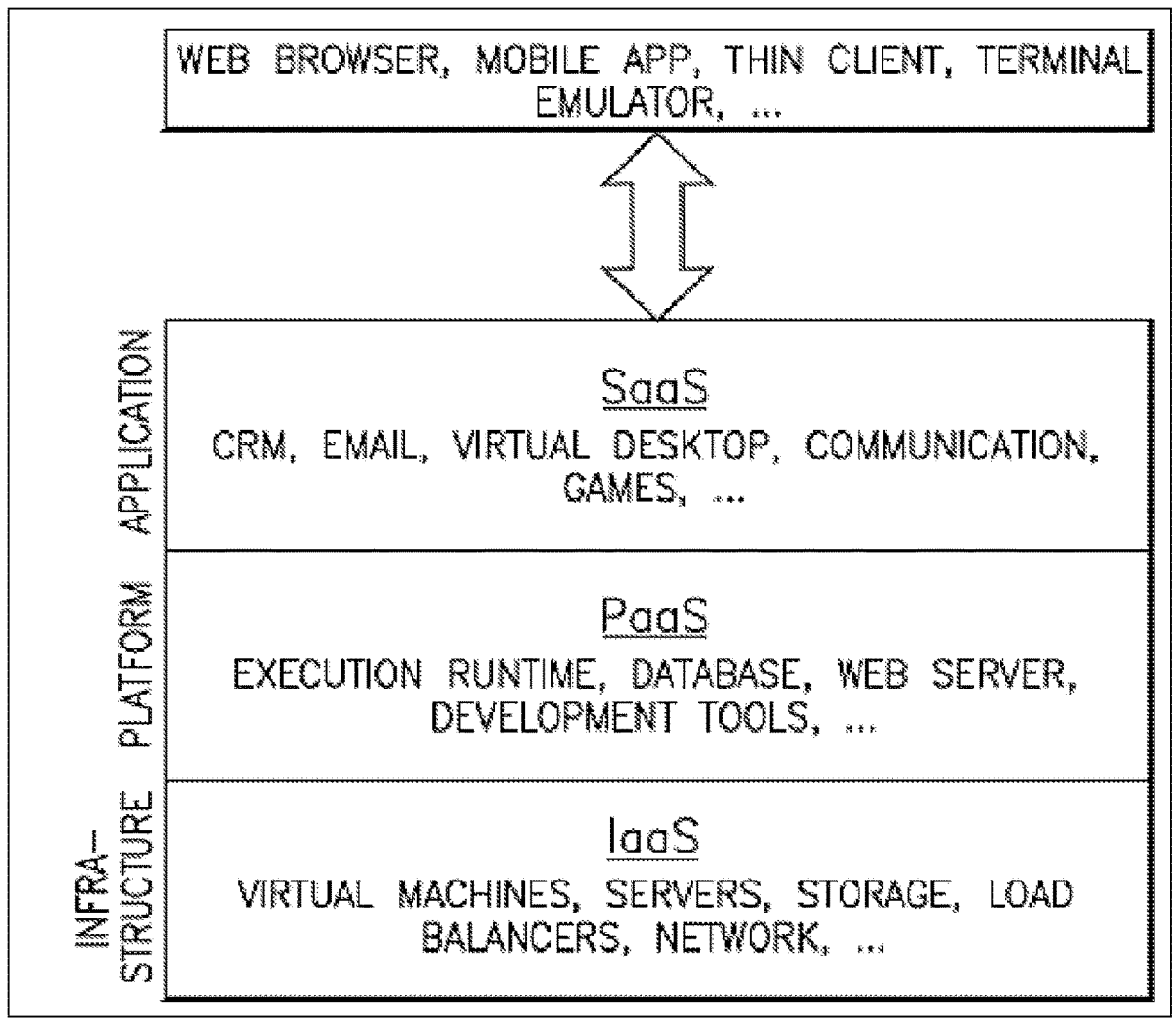

For purposes of the instant description, the terms "cloud," "Internet cloud," "cloud computing," "cloud architecture," and similar terms correspond to at least one of the following utilized by the exemplary inventive computer-programmed systems and the exemplary inventive computer-processing methods of the present invention: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). In some embodiments, the inventive computer flexible lease basis system offers/manages the cloud computing/architecture as, but not limiting to: infrastructure a service (IaaS), platform as a service (PaaS), and software as a service (SaaS). FIGS. 3 and 4 illustrate schematics of exemplary implementations of the cloud computing/architecture which may be utilized by the exemplary specifically programmed engine of the present invention.

In some embodiments, the present invention provides for an exemplary self-adaptive, self-train computer system which includes at least the following components: a plurality of electronic content feeds from a plurality of distinct electronic sources; at least one content database that is configured to store at least: i) initial content data derived from the plurality of electronic content feeds, and ii) vocabulary data that includes at least one vocabulary data set that includes at least one of: 1) a set of pre-determined words, phrases, or both, and 2) a set of user-specific words, phrases, or both that is associated with at least one particular user of the system; a non-transient memory, storing particular program code; and at least one computer processor that, when executing the particular program code, is configured to perform at least the following operations: obtaining at least one portion of the initial content data from the at least one content database; applying at least one machine learning model to transform the at least one portion of the initial content data into a N-dimensional vector space; self-training the at least one machine learning model based on the at least one vocabulary data set; applying at least one clustering technique to the N-dimensional vector space to generate a cluster model that defines a plurality of clusters, where each cluster includes a plurality of word representations from the at least one portion of the initial content data; associating each cluster of the plurality of clusters of the cluster model with at least cluster identifier; obtaining at least one portion of first subsequent content data from the at least one content database; where the first subsequent content data is content data received from the plurality of electronic content feeds from the plurality of distinct electronic sources after the cluster model has been generated during at least one first time period; associating each data element of at least one portion of the first subsequent content data with each respective cluster of the plurality of clusters of the cluster model to generate a content data cluster mapping model; continuously tracking, for each user, in real-time, each respective cluster identifier of each respective cluster associated with at least one action performed by each respective user with at least one data element from at least one respective portion of the first subsequent content data during each respective time period to continuously self-adapt each respective user-specific, time-specific dynamic cluster mapping model based, at least in part, on the at least one action performed by each respective user during each respective time; where each respective user-specific, time-specific dynamic cluster mapping model includes a plurality of user-specific, time-specific cluster identifiers; continuously updating, for each user, each respective user-specific, time-specific dynamic cluster mapping model in at least one user profile database; applying each respective user-specific, time-specific dynamic cluster mapping model to at least one portion of second content data obtained during at least one second time period to determine a user-specific output content data to be delivered to each respective user at a particular time period; and causing to display the user-specific output content data on a screen of at least one portable electronic device of each respective user.

In some embodiments, the user-specific output content data includes: i) a first portion that has been determined based, at least in part, on one or more cluster identifiers of each respective user-specific, time-specific dynamic cluster mapping model at a particular time period, and ii) a second portion that has not been determined based, at least in part, on one or more cluster identifiers of each respective user-specific, time-specific dynamic cluster mapping model at the particular time period.

In some embodiments, the first portion and the second portion are at a pre-determined ratio.

In some embodiments, the at least one computer processor is further configured to perform at least the following operations: updating, for each user, each respective user-specific, time-specific dynamic cluster mapping model based, at least in part, on at least one of: i) at least one biological feature of each respective user, ii) at least one social feature of each respective user, iii) at least one economic feature of each respective user, iv) at least one behavioral feature of each respective user, and v) any combination thereof.

In some embodiments, the at least one computer processor is further configured to perform the operations with a pre-determined frequency.

In some embodiments, the at least one machine learning model is Doc2Vec model.

In some embodiments, the at least one clustering technique assigns each respective word representation to a particular cluster to which each respective word representation has the smallest respective angular distance.

In some embodiments, the at least one computer processor is further configured to perform: obtaining user-specific educational content data from at least one educational feed based, at least in part, on each respective user-specific, time-specific dynamic cluster mapping model; and causing to display the user-specific educational content data on the screen of the at least one portable electronic device of each respective user.

In some embodiments, the at least one computer processor is further configured to perform: automatically subscribing each respective user to receive at least one content feed based, at least in part, on each respective user-specific, time-specific dynamic cluster mapping model.

In some embodiments, N of the N-dimensional vector space is pre-determined.

In some embodiments, the present invention provides for an exemplary computer-implemented method which includes at least the following steps: obtaining, by at least one processor, at least one portion of initial content data from at least one content database; where the at least one content database includes: i) the initial content data derived from a plurality of electronic content feeds from a plurality of distinct electronic sources, and ii) vocabulary data that includes at least one vocabulary data set that includes at least one of: 1) a set of pre-determined words, phrases, or both, and 2) a set of user-specific words, phrases, or both that is associated with at least one particular user; applying, by the at least one processor, at least one machine learning model to transform the at least one portion of the initial content data into a N-dimensional vector space; self-training, by the at least one processor, the at least one machine learning model based on the at least one vocabulary data set; applying, by the at least one processor, at least one clustering technique to the N-dimensional vector space to generate a cluster model that defines a plurality of clusters, where each cluster includes a plurality of word representations from the at least one portion of the initial content data; associating, by the at least one processor, each cluster of the plurality of clusters of the cluster model with at least cluster identifier; obtaining, by the at least one processor, at least one portion of first subsequent content data from the at least one content database; where the first subsequent content data is content data received from the plurality of electronic content feeds from the plurality of distinct electronic sources after the cluster model has been generated during at least one first time period; associating, by the at least one processor, each data element of at least one portion of the first subsequent content data with each respective cluster of the plurality of clusters of the cluster model to generate a content data cluster mapping model; continuously tracking, for each user, in real-time, by the at least one processor, each respective cluster identifier of each respective cluster associated with at least one action performed by each respective user with at least one data element from at least one respective portion of the first subsequent content data during each respective time period to continuously self-adapt each respective user-specific, time-specific dynamic cluster mapping model based, at least in part, on the at least one action performed by each respective user during each respective time; where each respective user-specific, time-specific dynamic cluster mapping model includes a plurality of user-specific, time-specific cluster identifiers; continuously updating, for each user, by the at least one processor, each respective user-specific, time-specific dynamic cluster mapping model in at least one user profile database; applying, by the at least one processor, each respective user-specific, time-specific dynamic cluster mapping model to at least one portion of second content data obtained during at least one second time period to determine a user-specific output content data to be delivered to each respective user at a particular time period; and causing, by the at least one processor, to display the user-specific output content data on a screen of at least one portable electronic device of each respective user.

While a number of embodiments of the present invention have been described, it is understood that these embodiments are illustrative only, and not restrictive, and that many modifications may become apparent to those of ordinary skill in the art. Further still, the various steps of herein detailed methods may be carried out in any desired order (and any desired steps may be added and/or any desired steps may be eliminated).

What is claimed is:

1. A computer system, comprising:
   a plurality of electronic content feeds from a plurality of distinct electronic sources;
   at least one content database that is configured to store at least initial content data derived from the plurality of electronic content feeds;
   a non-transient memory, storing particular program code; and
   at least one computer processor that, when executing the particular program code, is configured to:
      obtain at least one portion of the initial content data from the at least one content database;
      apply at least one machine learning model to transform the at least one portion of the initial content data into a N-dimensional vector space;
      apply at least one clustering technique to the N-dimensional vector space to generate a cluster model that defines a plurality of vector clusters;
      obtain at least one portion of first subsequent content data from the at least one content database;
      wherein the first subsequent content data is content data received from the plurality of electronic content feeds from the plurality of distinct electronic sources after the cluster model has been generated during at least one first time period;
      associate each data element of at least one portion of the first subsequent content data with each respective vector cluster of the plurality of vector clusters of the cluster model to generate a content data cluster mapping model;
      continuously track, in real-time, activity of each respective user regarding at least one data element from at least one respective portion of the first subsequent content data during each respective time period to form a plurality of respective continuously self-adapting user-specific, time-specific dynamic cluster mapping models; and
      automatically provide, to each respective user, based, at least in part, on each respective continuously self-adapting user-specific, time-specific dynamic cluster mapping model, at least one relevant subscription recommendation regarding at least one recommended content feed without a need that each respective user is to take an action that would identify a desire by each respect user to be subscribed to the at least one content feed.

2. The computer system of claim 1, wherein the at least one computer processor, when executing the particular program code, is further configured to:
   apply each respective continuously self-adapting user-specific, time-specific dynamic cluster mapping model to at least one portion of second content data obtained during at least one second time period to determine a user-specific output content data to be delivered to each respective user at a particular time period.

3. The computer system of claim 1, wherein the at least one computer processor is further configured to:
   update, for each user, each respective continuously self-adapting user-specific, time-specific dynamic cluster mapping model based, at least in part, on at least one of:
   i) at least one biological feature of each respective user,
   ii) at least one social feature of each respective user,
   iii) at least one economic feature of each respective user,
   iv) at least one behavioral feature of each respective user, and
   v) any combination thereof.

4. The computer system of claim 1, wherein the at least one machine learning model is Doc2Vec model.

5. The computer system of claim 1, wherein the at least one recommended content feed is at least one of:
   i) at least one educational information feed,
   ii) at least one recommendation feed,
   iii) at least one feed with mobile applications-related information, or
   iv) at least one feed with trading-related information, or
   v) at least one news feed.

6. The computer system of claim 5, wherein the at least one computer processor is further configured to perform:
   cause to deliver at least one portion of the at least one recommended content feed to at least one portable electronic device of each respective user.

7. A computer-implemented method, comprising:
   obtaining, by at least one processor, at least one portion of initial content data from at least one content database;
   wherein the at least one content database comprises the initial content data derived from a plurality of electronic content feeds from a plurality of distinct electronic sources;
   applying, by the at least one processor, at least one machine learning model to transform the at least one portion of the initial content data into a N-dimensional vector space;
   applying, by the at least one processor, at least one clustering technique to the N-dimensional vector space to generate a cluster model that defines a plurality of vector clusters;

obtaining, by the at least one processor, at least one portion of first subsequent content data from the at least one content database;

wherein the first subsequent content data is content data received from the plurality of electronic content feeds from the plurality of distinct electronic sources after the cluster model has been generated during at least one first time period;

associating, by the at least one processor, each data element of at least one portion of the first subsequent content data with each respective vector cluster of the plurality of vector clusters of the cluster model to generate a content data cluster mapping model;

continuously tracking, for each user, in real-time, by the at least one processor, activity of each respective user regarding at least one data element from at least one respective portion of the first subsequent content data during each respective time period to form a plurality of respective continuously self-adapting user-specific, time-specific dynamic cluster mapping model; and automatically providing, by the at least one processor, to each respective user, based, at least in part, on each respective continuously self-adapting user-specific, time-specific dynamic cluster mapping model, at least one relevant subscription recommendation regarding at least one recommended content feed without a need that each respective user is to take an action that would identify a desire by each respect user to be subscribed to the at least one recommended content feed.

8. The computer-implemented method of claim 7, further comprising:

applying, by the at least one processor, each respective continuously self-adapting user-specific, time-specific dynamic cluster mapping model to at least one portion of second content data obtained during at least one second time period to determine a user-specific output content data to be delivered to each respective user at a particular time period.

9. The computer-implemented method of claim 7, wherein the method further comprises:

updating, for each user, by the at least one processor, each respective continuously self-adapting user-specific, time-specific dynamic cluster mapping model based, at least in part, on at least one of:

i) at least one biological feature of each respective user, ii) at least one social feature of each respective user, iii) at least one economic feature of each respective user, iv) at least one behavioral feature of each respective user, and v) any combination thereof.

10. The computer system of claim 7, wherein the at least one machine learning model is Doc2Vec model.

11. The computer-implemented method of claim 7, wherein the at least one recommended content feed is at least one of:

i) at least one educational information feed, ii) at least one recommendation feed, iii) at least one feed with mobile applications-related information, or iv) at least one feed with trading-related information, or v) at least one news feed.

12. The computer-implemented method of claim 7, further comprising:

causing, by the at least one processor, to deliver at least one portion of the at least one recommended content feed to at least one portable electronic device of each respective user.

* * * * *